(12) United States Patent
Asano et al.

(10) Patent No.: US 9,770,974 B2
(45) Date of Patent: Sep. 26, 2017

(54) GRILL SHUTTER DEVICE

(71) Applicant: AISIN SEIKI KABUSHIKI KAISHA, Kariya-shi (JP)

(72) Inventors: Yoshimasa Asano, Kariya (JP); Eri Yamamoto, Chiryu (JP); Hitoshi Takayanagi, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 8 days.

(21) Appl. No.: 14/357,910

(22) PCT Filed: Dec. 14, 2012

(86) PCT No.: PCT/JP2012/082505
§ 371 (c)(1),
(2) Date: May 13, 2014

(87) PCT Pub. No.: WO2013/108528
PCT Pub. Date: Jul. 25, 2013

(65) Prior Publication Data
US 2014/0288760 A1    Sep. 25, 2014

(30) Foreign Application Priority Data

Jan. 17, 2012 (JP) ................. 2012-007356

(51) Int. Cl.
*B60K 11/08* (2006.01)
*B60R 19/48* (2006.01)
(52) U.S. Cl.
CPC ............ *B60K 11/085* (2013.01); *B60R 19/48* (2013.01); *B60R 2019/486* (2013.01)

(58) Field of Classification Search
CPC .................................................. B60K 11/085
(Continued)

(56) References Cited

U.S. PATENT DOCUMENTS 4,779,577 A * 10/1988 Ritter et al. ............... 123/41.05
6,012,297 A *  1/2000 Ichishi et al. ................ 62/179
(Continued)

FOREIGN PATENT DOCUMENTS

| EP | 2 327 579 A1 | 6/2011 |
|---|---|---|
| JP | 2006-168631 | 6/2006 |
| JP | 2010-143507 | 7/2010 |
| JP | 2010-260440 | 11/2010 |

(Continued)

OTHER PUBLICATIONS

KR20020072982, Sep. 19, 2002, Jung, Publication with mapped KIPO machine translation.*
(Continued)

*Primary Examiner* — Michael McCullough
*Assistant Examiner* — Michael E Butler
(74) *Attorney, Agent, or Firm* — Oblon, McClelland, Maier & Neustadt, L.L.P.

(57) ABSTRACT

A shutter mechanism is adapted to be provided to a grill opening in a vehicle body. Opening and closing operations of the shutter mechanism are controlled by an electronic control unit (ECU). The ECU determines whether a vehicle is in a traveling end state. If the vehicle is in the traveling end state, the ECU determines whether or not the shutter mechanism is in an open state. If the ECU determines that the open state of the shutter mechanism cannot be confirmed, the ECU controls the shutter mechanism to open the shutter mechanism.

14 Claims, 5 Drawing Sheets

(58) Field of Classification Search
USPC .......................................................... 701/29.2
See application file for complete search history.

(56) References Cited

U.S. PATENT DOCUMENTS

| | | | | |
|---|---|---|---|---|
| 2006/0095178 | A1* | 5/2006 | Guilfoyle et al. | 701/36 |
| 2010/0282533 | A1 | 11/2010 | Sugiyama | |
| 2011/0118931 | A1* | 5/2011 | Kawato | 701/30 |
| 2011/0281515 | A1* | 11/2011 | Lockwood et al. | 454/75 |
| 2014/0005897 | A1* | 1/2014 | Hayakawa et al. | 701/49 |
| 2014/0102817 | A1 | 4/2014 | Asano et al. | |
| 2014/0230760 | A1* | 8/2014 | Okamoto | F01P 7/026 123/41.05 |
| 2015/0353077 | A1* | 12/2015 | Asami | B60K 6/445 701/22 |
| 2016/0311313 | A1* | 10/2016 | Hori | G05D 3/12 |

FOREIGN PATENT DOCUMENTS

| | | | |
|---|---|---|---|
| JP | 2011-068233 | 4/2011 | |
| JP | 2011-079405 | 4/2011 | |
| JP | 2011-098596 | 5/2011 | |
| JP | 2011-105221 | 6/2011 | |
| JP | 2012-001112 | 1/2012 | |
| WO | WO 2012/127292 A1 * | 9/2012 | ............. B60K 11/08 |

OTHER PUBLICATIONS

International Search Report issued Mar. 5, 2013, in PCT/JP12/082505, filed Dec. 14, 2012.
English translation of the International Preliminary Report on Patentability and Written Opinion issued Jul. 22, 2014, in PCT/JP2012/082505.
Extended European Search Report issued Jul. 10, 2015 in Patent Application No. 12866230.1.

* cited by examiner

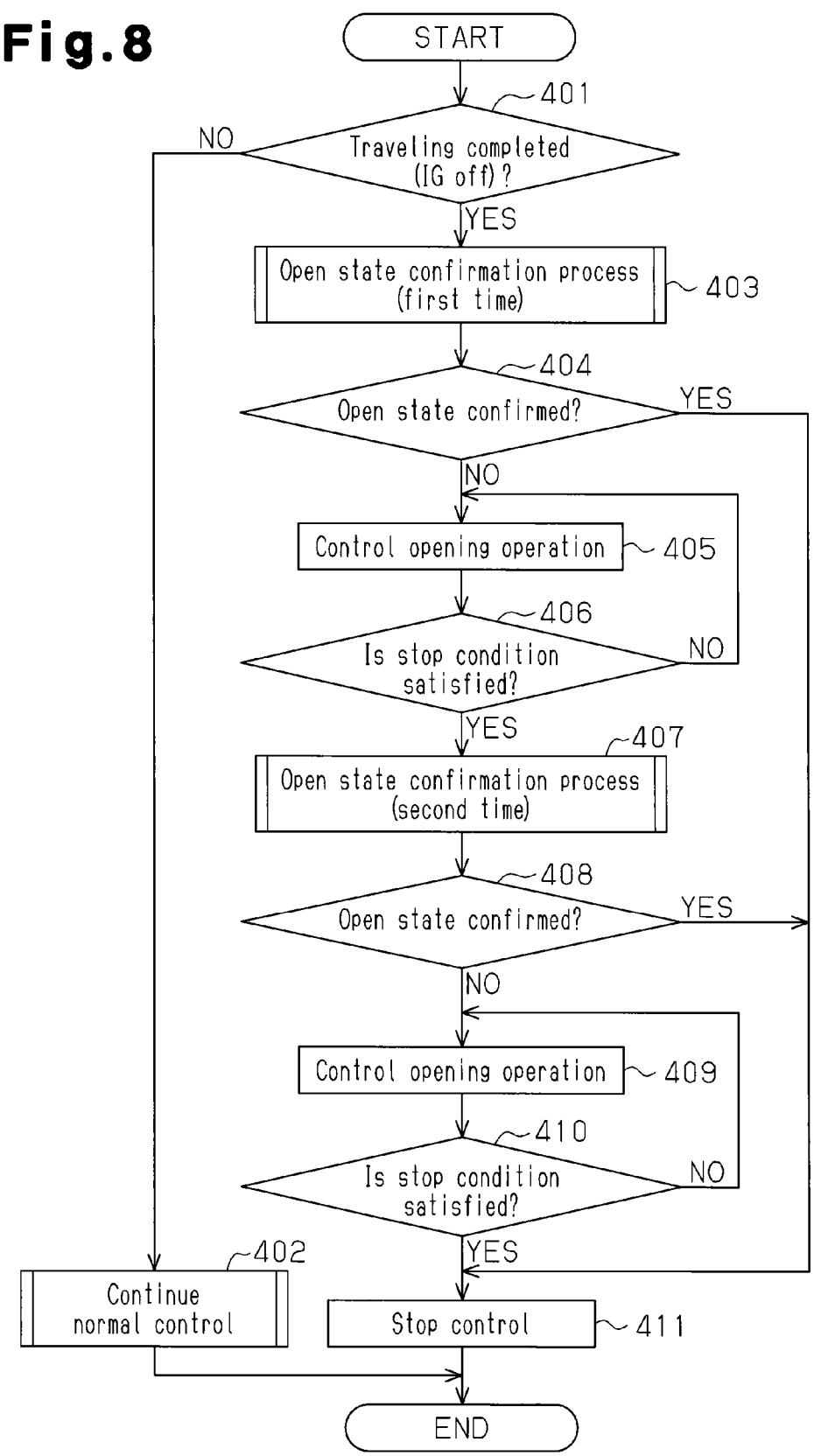

GRILL SHUTTER DEVICE

FIELD OF THE INVENTION

The present invention relates to a grill shutter device.

BACKGROUND OF THE INVENTION

Patent Document 1 discloses a grill shutter device that can control the flow rate of air flowing from grill opening into an engine compartment according to opening and closing operations of shutter mechanism provided in the grill opening in the front portion of a vehicle body.

In the grill shutter device, for example, when the vehicle is travelling at high speed, the shutter mechanism is closed and the air flowing into the engine compartment is limited so that the aerodynamic performance (such as Cd value) of the vehicle can be improved. When starting the engine, the flow rate of the air introduced into the radiator is limited so that the warm-up time of the engine is reduced. Further, when the engine temperature tends to be increased, the shutter mechanism is opened so that the flow rate of the air flowing into the engine compartment is increased. Accordingly, the engine temperature is appropriately controlled.

Generally, such a grill shutter device is configured to open the shutter mechanism after usual opening and closing controls of the shutter mechanism is completed by turning off the ignition switch. That is, the shutter mechanism is closed when the vehicle is in the stopped state. This restricts the shutter mechanism from being stuck into the closed state. Further, Patent Document 1 discloses a configuration for forcibly terminating the opening and closing controls of the shutter mechanism to open the shutter mechanism when the voltage supplied to the driving motor of the shutter mechanism is reduced. This avoids the situation in which the amount of the air flowing into the vehicle is insufficient due to the stuck closed state of the shutter mechanism as described above.

PATENT DOCUMENT

Patent Document 1: Japanese Laid-Open Patent Publication No. 2010-260440

SUMMARY OF THE INVENTION

However, as the opening and closing operations of the shutter mechanism is increased, the period of endurance of the shutter mechanism tends to be reduced. Such a tendency is eminent when a load is applied to the shutter mechanism more than needed, for example, when the already opened shutter mechanism is further opened. Accordingly, there is a room for improvement regarding this point.

An objective of the present invention is to provide a grill shutter device by which a shutter mechanism is more reliably prevented from being held stopped in the closed state and an excessive operation is limited so that the period of endurance is prolonged.

To achieve the above described object, the present invention provides a grill shutter device that includes a shutter mechanism, a control portion, a traveling end determination portion, and a confirmation portion. The shutter mechanism is adapted to be provided in a grill opening in a front portion of a vehicle body. The shutter mechanism is operated to be opened and closed to control a rate of flow of an air flowing into the vehicle body. The control portion controls opening and closing operations of the shutter mechanism. The traveling end determination portion determines whether a vehicle is in a traveling end state. The confirmation portion confirms that the shutter mechanism is in an open state in the traveling end state. The control portion controls the shutter mechanism to open the shutter mechanism when the open state of the shutter mechanism is not confirmed by the confirmation portion.

According to the present invention, after the end of the traveling of the vehicle, if the open state of the shutter mechanism is not confirmed, the shutter mechanism is controlled to be opened. Accordingly, the shutter mechanism is more reliably prevented from being held stopped in the closed state. In contrast, if the open state of the shutter mechanism is confirmed after the end of the traveling of the vehicle, the opening operation control is not performed. Accordingly, an excessive operation of the shutter mechanism is limited so that the period of endurance is prolonged.

BRIEF DESCRIPTION OF THE DRAWINGS

FIG. 8 is a flowchart illustrating a control process of a grill shutter device according to another embodiment.

DETAILED DESCRIPTION OF THE PREFERRED EMBODIMENTS

First Embodiment

A description will be given below of a first embodiment of the present invention with reference to the accompanying drawings.

Figure 1:
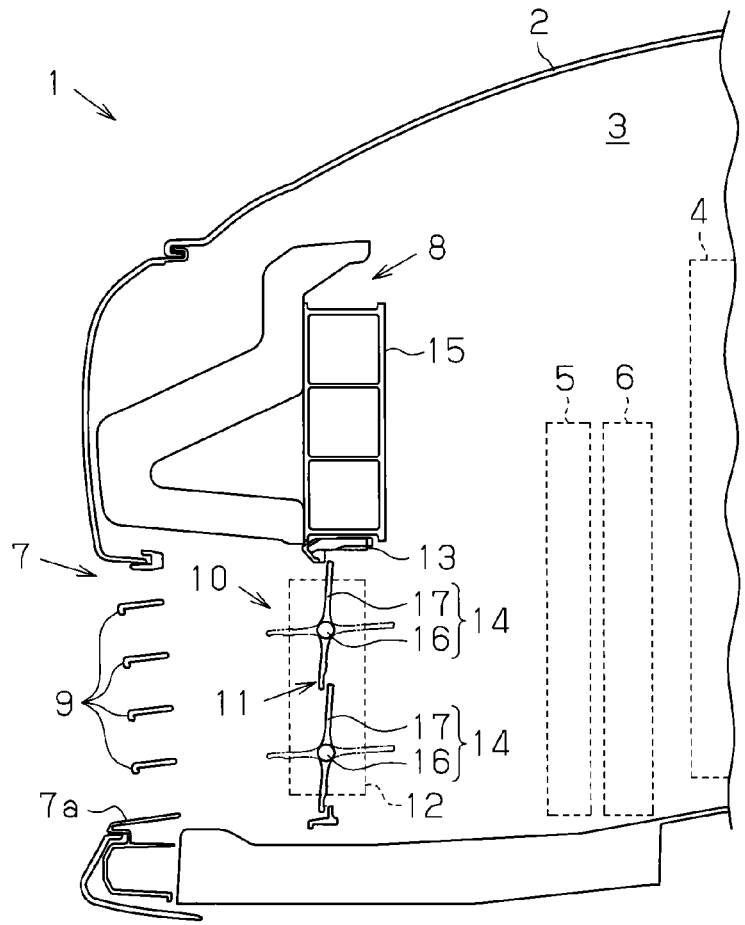
FIG. 1 is a diagram schematically illustrating a vehicle on which a grill shutter device according to the present invention is mounted.

In a vehicle 1 shown in FIG. 1, an engine compartment 3 formed in a vehicle body 2 accommodates an engine 4 and a radiator (heat exchanger) 5 for cooling the engine 4. A grill opening 7 that connects an outer space in front of the vehicle 1 with an inner space (engine compartment 3) of the vehicle body 2 is formed in the front portion of the vehicle body 2 (the left end in FIG. 1). The radiator 5 is arranged in front of the engine 4 such that the air flowing from the grill opening 7 into the engine compartment 3 blows against the radiator 5.

A fan 6 is provided behind the radiator 5 (right as viewed in FIG. 1). When the fan 6 rotates, the air efficiently flows to the radiator 5.

According to the present embodiment, the grill opening 7 is formed below a bumper 8. A front grill (lower grill) 9, which forms an ornamental surface, is attached to an opening edge 7a of the grill opening 7. The vehicle 1 according to the present embodiment includes a grill shutter device 10, which controls the flow rate of the air flowing from the grill opening 7 into the engine compartment 3.

More specifically, the grill shutter device 10 includes a shutter mechanism 11, which controls the flow rate of the air through the opening and closing operations of the shutter mechanism 11, and an actuator portion 12, which opens and closes the shutter mechanism 11.

The shutter mechanism 11 includes a frame 13, which is shaped in substantially a rectangular frame, and a plurality of movable fins 14, which are vertically aligned in an opening region defined by the frame 13. The frame 13 is arranged in the grill opening 7 in such a state where the upper end of the frame 13 is fixed to a bumper reinforcing member 15. Each movable fin 14 includes a rotary shaft 16, which extends in the widthwise direction of the frame 13 (a direction perpendicular to the sheet of FIG. 1) and is rotationally supported by the frame 13. Each movable fin 14 includes a fin portion 17, which rotates about the axis of the rotary shaft 16 along with the rotary shaft 16. The fin portion 17 opens and closes the opening region of the frame 13 in accordance with the rotation.

The shutter mechanism 11 is configured such that it comes into the open state in which the opening region of the frame 13 is opened and the closed state in which the opening region is closed. FIG. 1 shows the shutter mechanism 11 in the closed state. Each movable fin 14 rotates in the clockwise direction in FIG. 1 from the state shown in FIG. 1 until the fin portion 17 is substantially parallel to the direction of the air flowing from the grill opening 7. This brings the shutter mechanism 11 into the open state. In contrast, when each movable fin 14 rotates in the counterclockwise direction in FIG. 1 from the open state of the shutter mechanism 11, the shutter mechanism 11 is brought into the closed state shown in FIG. 1. When each movable fin 14 is in the rotation position corresponding to the closed state, the opening region of the frame 13 is closed by stacked tip ends of the movable fins 14 that are adjacent to each other.

Figure 2:
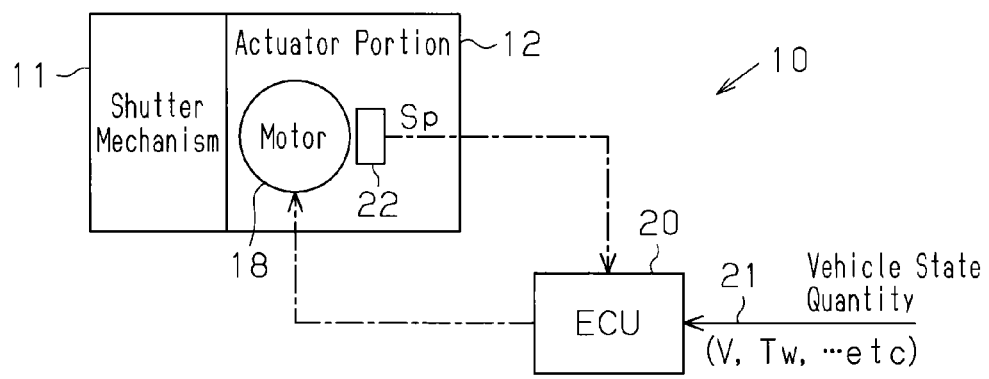
FIG. 2 is a block diagram illustrating a control of the grill shutter device according to a first embodiment.

As shown in FIG. 2, an actuator portion 12 rotates each movable fin 14 with a motor 18, which serves as a drive source, to drive the shutter mechanism 11 to be opened and closed. The actuator portion 12 is controlled by an ECU 20, which serves as a control portion.

That is, the ECU 20 controls the opening and closing operations of the shutter mechanism 11 through the control of the actuator portion 12. The grill shutter device 10 controls the flow rate of the air flowing from the grill opening 7 into the engine compartment 3 according to the opening and closing operations of the shutter mechanism 11 by the rotation of each movable fin 14.

The ECU 20 is configured such that various types of vehicle state quantity such as vehicle speed V and a temperature Tw of the coolant of the engine 4 is input into the ECU 20. The ECU 20 performs the opening and closing controls of the shutter mechanism 11 on the basis of the vehicle state quantity.

Specifically, when communication of the various types of the vehicle state quantity via an in-vehicle network 21 is started, the ECU 20 recognizes that the ignition switch (start switch) of the vehicle 1 has been turned ON (IG ON). That is, the ECU 20 recognizes that the vehicle 1 is in the traveling state or in the traveling preparation state. In other words, when the communication of the various types of the vehicle state quantity via the in-vehicle network 21 is started, the ECU 20 recognizes that the vehicle 1 is in the operation state (or the vehicle 1 is powered on). The ECU 20 performs well-known opening and closing operations such as holding the shutter mechanism 11 in the closed state until the temperature Tw of the coolant is increased to an acceptable value, or switching the shutter mechanism 11 to the closed state in accordance with the increase of the vehicle speed V.

Further, when the communication of the various types of the vehicle state quantity via the in-vehicle network 21 is stopped, the ECU 20 recognizes that the ignition switch of the vehicle 1 is turned OFF (IG OFF). That is, the ECU 20 recognizes that the vehicle 1 is in the traveling end state. In other words, when the communication of the various types of the vehicle state quantity via the in-vehicle network 21 is disconnected, the ECU 20 recognizes that the vehicle 1 is in the operation end state (or the vehicle 1 is powered off). Further, the ECU 20 confirms whether the shutter mechanism 11 is in the open state on the basis of the detection of an amount of the operations of the shutter mechanism 11 when the vehicle 1 is in the traveling end state. Specifically, the actuator portion 12 includes a pulse sensor 22, which serves as a pulse output portion for outputting pulse signals Sp in synchronization with the rotation of the motor 18. The ECU 20, which serves as an operation amount detection portion, detects the amount of the operations of the shutter mechanism 11 by counting the pulse signals Sp (specifically, edges of the pulse signals Sp). If the ECU 20 does not confirm that the shutter mechanism 11 is in the open state, the ECU 20 controls the actuator portion 12 to open the shutter mechanism 11.

Figure 3:
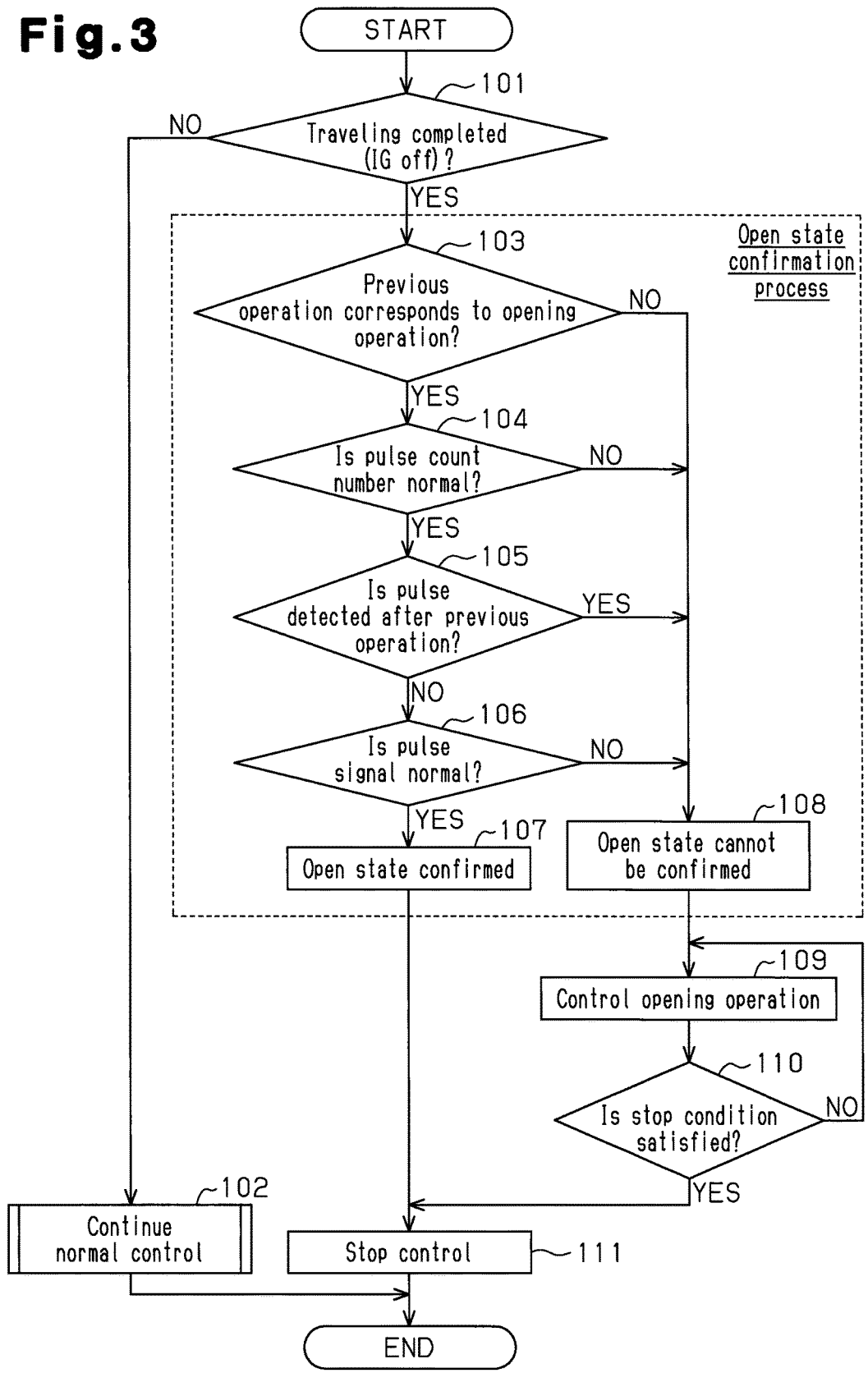
FIG. 3 is a flowchart illustrating a control process of the grill shutter device in FIG. 2.

More specifically, as shown in the flowchart of FIG. 3, the ECU 20 determines whether the vehicle 1 is in the traveling end state (step S101). If the vehicle 1 is not in the traveling end state (i.e., NO in step S101), the ECU 20 continues the usual opening and closing controls on the basis of the temperature Tw of the coolant and the vehicle speed V (step S102). If the vehicle 1 is in the traveling end state (i.e., YES in step S101), the ECU 20 performs an open state confirmation process shown in the following steps S103 to S108.

Specifically, the ECU 20, which serves as a confirmation portion, determines whether the previous operation of the shutter mechanism 11 was an opening operation in step S103. Also, in step S104, the ECU 20 determines whether the number of counted pulses in the previous operation of the shutter mechanism 11 is normal. That is, the ECU 20 determines whether the amount of the operations of the shutter mechanism 11 in the previous operation was normal. Specifically, the ECU 20 stores a normal pulse value as a preset normal amount of operations, and determines whether the number of counted pulses in the previous operation of the shutter mechanism 11 was the normal pulse value. That is, the ECU 20 determines whether the amount of the operations of the shutter mechanism 11 in the previous operation was the normal amount of operations. The normal pulse value (amount of normal operations) may be a value showing a single number of counted pulses (amount of operations), or values showing an acceptable range of the numbers of counted pulses (amount of operations) that can be considered as normal. In step S105, the ECU 20 determines whether there has been a change in the pulse signals Sp, that is, whether the pulses have occurred, after the previous operation of the shutter mechanism 11 is completed.

In step S106, the ECU 20 determines whether the pulse signal Sp detected in the previous operation of the shutter mechanism 11 was normal. The pulse sensor 22 of the present embodiment is configured to output two pulse signals Sp generated by two Hall ICs. If any one of the two pulse signals Sp fails, the ECU 20, which serves as a pulse fault detection portion and a signal determination portion, determines that the pulse sensor 22 fails. That is, the ECU 20 determines that the pulse signals Sp supplied by the pulse sensor 22 are not normal (i.e., NO in step S106).

If all the determination conditions shown in steps S103, S104, and S106 are satisfied (i.e., YES in steps S103, S104, and S106) and the determination result in step S105 is NO, the ECU 20 confirms that the shutter mechanism 11 is in the open state (step S107). In contrast, if any of the determination conditions shown in steps S103, S104, and S106 is not satisfied (i.e., NO in any of steps S103, S104, and S106), or if the determination result in step S105 is YES, the ECU 20 determines that the open state of the shutter mechanism 11 cannot be confirmed (step S108).

If the ECU 20 determines that the open state of the shutter mechanism 11 cannot be confirmed in step S108, the ECU 20 controls the shutter mechanism 11 to open the shutter mechanism 11. That is, the ECU 20 performs an opening operation control after the end of traveling of the vehicle (step S109).

The opening operation control continues until a predetermined stop condition (step S110) is satisfied. In the present embodiment, elapse of a predetermined time from the start of the opening control operation is set as a predetermined stop condition. If the stop condition is satisfied (i.e., YES in step S110), the ECU 20 suspends the control of the shutter mechanism 11 (step S111).

In contrast, if the ECU 20 confirms the open state of the shutter mechanism 11 in above step S107, the ECU 20 suspends the control of the shutter mechanism 11 in step S111 without performing the opening operation control after the end of traveling of the vehicle shown in above steps S109 and S110.

That is, if the previous operation was not the opening operation (i.e., NO in step S103), the shutter mechanism 11 is not in the open state. Even if the previous operation was the opening operation, if the amount of operations of the shutter mechanism 11 in the immediately previous opening operation is not normal (i.e., NO in step S104), the shutter mechanism 11 is likely to be not in the open state. If the pulses are generated after the end of the previous operation of the shutter mechanism 11 (i.e., YES in step S105), each movable fin 14 may have been rotated by external force. That is, the shutter mechanism 11 is most likely to be not in the open state. Further, if the pulse signals Sp used as a basis of the detection of the amount of operations of the shutter mechanism 11 are not normal (i.e., NO in step S106), it cannot be confirmed that the shutter mechanism 11 is in the open state. The ECU 20 can perform an open state confirmation through the above determination process with high accuracy.

The present embodiment has the following advantages.

(1) The ECU 20 controls the opening and closing operations of the shutter mechanism 11. The ECU 20 determines whether or not the vehicle 1 is in the traveling end state (step S101), and if the vehicle 1 is in the traveling end state (i.e., YES in step S101), the ECU determines whether or not the shutter mechanism 11 is in the open state (steps S103 to S108). If the ECU 20 determines that the open state of the shutter mechanism 11 cannot be confirmed (step S108), the ECU 20 controls the shutter mechanism 11 to open the shutter mechanism 11 (step S109).

As mentioned above, in the present embodiment, after the end of traveling of the vehicle, if the open state of the shutter mechanism 11 cannot be confirmed, the shutter mechanism 11 is controlled to be opened. Accordingly, the shutter mechanism is more reliably prevented from being held stopped in the closed state. In contrast, after the end of traveling of the vehicle, if the open state of the shutter mechanism 11 is confirmed, the opening operation control is not performed. Accordingly, an excessive operation of the shutter mechanism 11 is limited so that the period of endurance is prolonged.

(2) If the previous operation of the shutter mechanism 11 was not the opening operation (i.e., NO in step S103), the ECU 20 determines that the open state of the shutter mechanism 11 cannot be confirmed (step S108), and performs the opening operation control after the end of traveling of the vehicle (step S109).

That is, if the previous operation was no the opening operation, the shutter mechanism 11 is not in the open state. Therefore, according to the above configuration, the open state of the shutter mechanism 11 is confirmed with high accuracy.

(3) If the number of counted pulses in the previous operation was not normal (i.e., NO in step S104), the ECU 20 determines that the open state of the shutter mechanism 11 cannot be confirmed (step S108), and performs the opening operation control after the end of traveling of the vehicle (step S109).

That is, if the amount of operations of the shutter mechanism 11 in the immediately previous opening operation was not normal, the shutter mechanism 11 is likely to be not in the open state. Therefore, according to the above configuration, the open state of the shutter mechanism 11 is confirmed with high accuracy.

(4) If the pulses are generated after the end of the previous operation of the shutter mechanism 11 (i.e., YES in step S105), the ECU 20 determines that the open state of the shutter mechanism 11 cannot be confirmed (step S108), and performs the opening operation control after the end of traveling of the vehicle (step S109).

That is, if the pulses are generated after the end of the previous operation of the shutter mechanism 11, i.e., if the pulse signals are changed, each movable fin 14 may have been rotated by the external force. That is, the shutter mechanism 11 is most probably not in the open state. Therefore, according to the above configuration, the open state of the shutter mechanism 11 is confirmed with high accuracy.

(5) If the detected pulse signals Sp are not normal (i.e., NO in step S106), the ECU 20 determines that the open state of the shutter mechanism 11 cannot be confirmed (step S108), and performs the opening operation control after the end of traveling of the vehicle (step S109).

That is, if the pulse signals Sp used as a basis of the detection of the amount of operations of the shutter mechanism 11 are not normal, the pulse sensor 22 may be out of order, and it cannot be confirmed that the shutter mechanism 11 is in the open state. Therefore, according to the above configuration, the open state of the shutter mechanism 11 is confirmed with high accuracy.

Second Embodiment

A description will be given below of a second embodiment of the present invention with reference to the accompanying drawings. In the present embodiment, the mode of confirmation of the open state is different from that in the above first embodiment. Accordingly, like or the same reference numerals are given to those components that are like or the same as the corresponding components of the first embodiment and detailed explanations are omitted.

Figure 4:
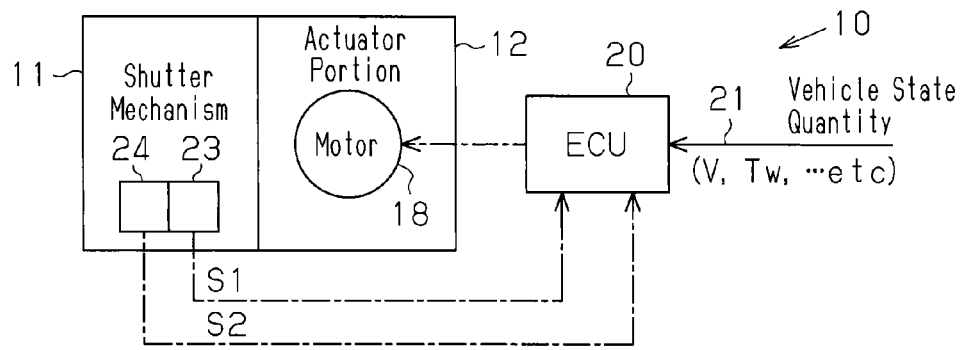
FIG. 4 is a block diagram illustrating a control of a grill shutter device according to a second embodiment.

As shown in FIG. 4, in the present embodiment, the shutter mechanism 11 includes an open position limit switch 23 and a close position limit switch 24. The open position limit switch 23 is turned ON when the shutter mechanism 11 is at the operation position corresponding to the open state. The close position limit switch 24 is turned ON when the shutter mechanism 11 is at the operation position corresponding to the closed state. The phrase "the operation position of the shutter mechanism 11" refers to the rotation position of each movable fin 14 that configures the shutter mechanism 11.

Further, the ECU 20 in the present embodiment serves as a position detection portion, which detects the operation position of the shutter mechanism 11 on the basis of the operation states of the limit switches (23 and 24), i.e., output signals S1 and S2 of the limit switches (23 and 24). The ECU 20, which serves as a confirmation portion, performs an open state confirmation process after the end of traveling of the vehicle on the basis of the detected operation position.

Figure 5:
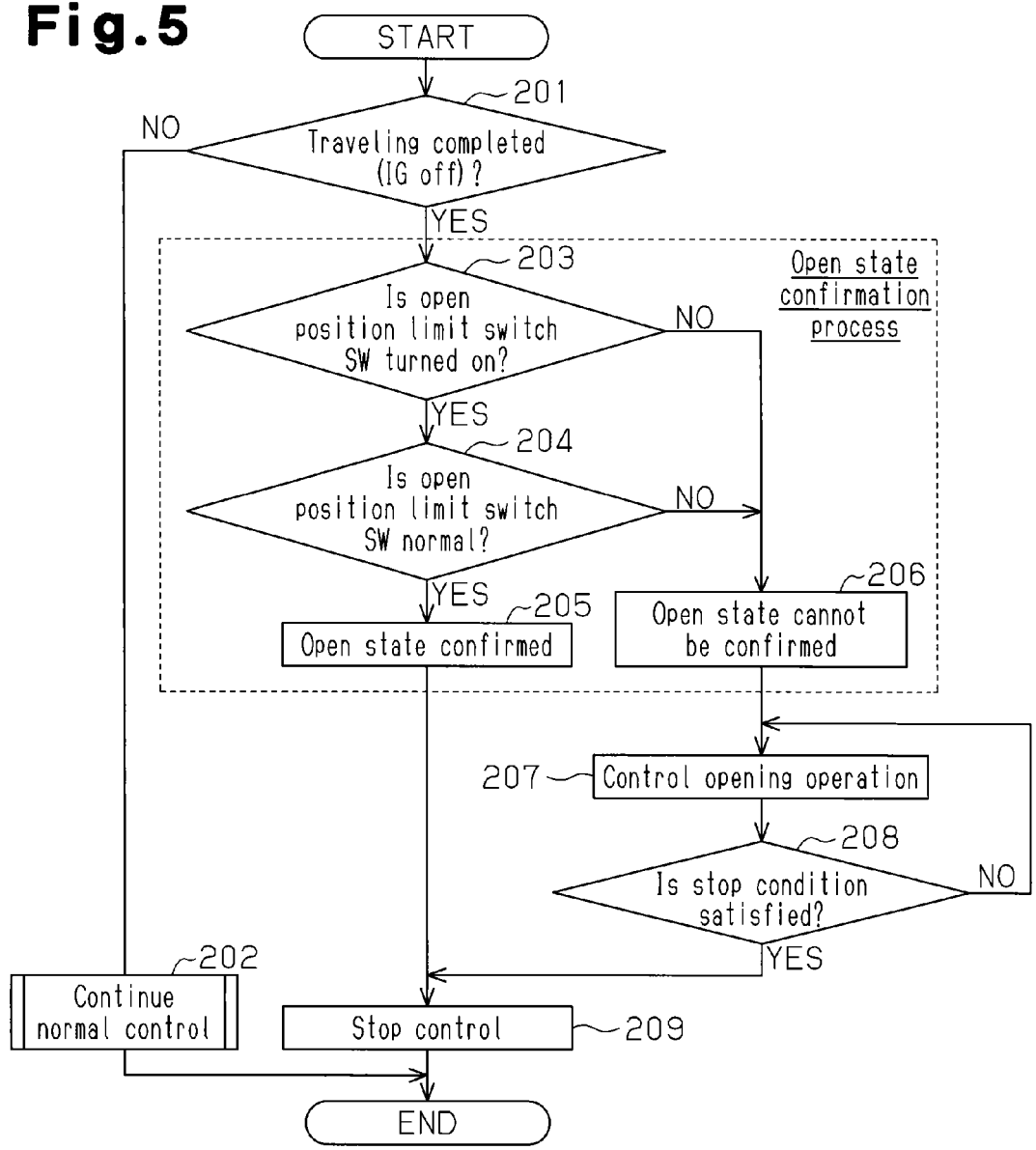
FIG. 5 is a flowchart illustrating a control process of the grill shutter device in FIG. 4.

More specifically, as shown in the flowchart of FIG. 5, if the vehicle 1 is in the traveling end state (i.e., YES in step S201), the ECU 20 determines whether the open position limit switch 23 is ON based on the output signals S1 of the open position limit switch 23 (step S203).

Figure 6:
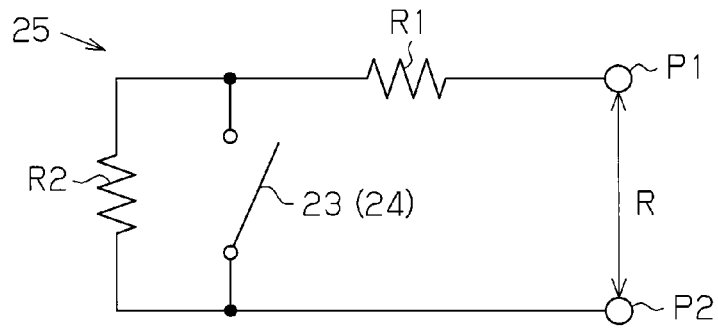
FIG. 6 is a diagram schematically illustrating a configuration of a disconnection detection circuit in the grill shutter device in FIG. 4.

Also, the ECU 20 determines whether the open position limit switch 23 is normal (step S204). As shown in FIG. 6, in the present embodiment, the open position limit switch 23 is incorporated into a well-known fault detection circuit 25. The fault detection circuit 25 includes a first resistor R1 connected to the open position limit switch 23 in series, and a second resistor R2 connected to the open position limit switch 23 in parallel. The ECU 20, which serves as a switch fault detection portion, detects fault of the open position limit switch 23, more specifically, the disconnection fault or the short-circuit fault occurred in the vicinity of the open position limit switch 23 on the basis of the change of the resistance value R across terminals P1 and P2 of the fault detection circuit 25.

That is, in the fault detection circuit 25, the first resistor R1 has a comparatively low resistance value, and the second resistor R2 has a comparatively high resistance value. Accordingly, the resistance value R across the terminals P1 and P2 is lower when the open position limit switch 23 is turned ON, and higher when the open position limit switch 23 is turned OFF. However, when wiring portions provided nearer the terminals P1 and P2 with respect to the open position limit switch 23 are disconnected, the resistance value R is infinite independent of the ON or OFF state of the open position limit switch 23. When the short circuit occurs in the wiring portions, the resistance value R is zero independent of the ON or OFF state of the open position limit switch 23.

The close position limit switch 24 is also incorporated into a fault detection circuit configured the same as the above fault detection circuit 25.

If all the determination conditions shown in steps S203 and S204 are satisfied (i.e., YES in step S203 and YES in step S204), the ECU 20 in the present embodiment confirms that the shutter mechanism 11 is in the open state (step S205). In contrast, if any of the determination conditions is not satisfied (i.e., NO in step S203 or NO in step S204), the ECU 20 determines that the open state of the shutter mechanism 11 cannot be confirmed (step S206).

That is, if the open position limit switch 23 used for detecting the operation position of the shutter mechanism 11 is out of order, the open state of the shutter mechanism 11 cannot be confirmed.

If the ECU 20 determines that the open state of the shutter mechanism 11 cannot be confirmed (step S206), the ECU 20 controls the shutter mechanism 11 to open the shutter mechanism 11 in the same manner as in the above first embodiment (steps S207 and S208). If the stop condition is satisfied (i.e., YES in step S208), the ECU 20 suspends the control of the shutter mechanism 11 (step S209).

As mentioned above, according to the present embodiment, advantages the same as those of the above first embodiment can be obtained. In particular, in the present embodiment, the open state of the shutter mechanism 11 is confirmed and determined with high accuracy in a simple structure on the basis of the operation state of the open position limit switch 23 and the presence/absence of the failure of the open position limit switch 23.

Since steps S201 and S202, and steps S207 to S209 in the flowchart of FIG. 5 are each equivalent to corresponding one of steps S101 and S102, and steps S109 to S111 in the flowchart of FIG. 3, the explanations thereof are omitted.

Third Embodiment

A description will be given below of a third embodiment of the present invention with reference to the accompanying drawings. In the present embodiment, the mode of confirmation of the open state is different from that in the above first embodiment. Accordingly, like or the same reference numerals are given to those components that are like or the same as the corresponding components of the first embodiment and detailed explanations are omitted.

In the present embodiment, the ECU 20, which serves as a measurement portion, measures operation time of the shutter mechanism 11 using a timer (not shown) that the ECU 20 includes. The ECU 20, which serves as a confirmation portion, performs an open state confirmation process after the end of traveling of the vehicle on the basis of the measured operation time.

Figure 7:
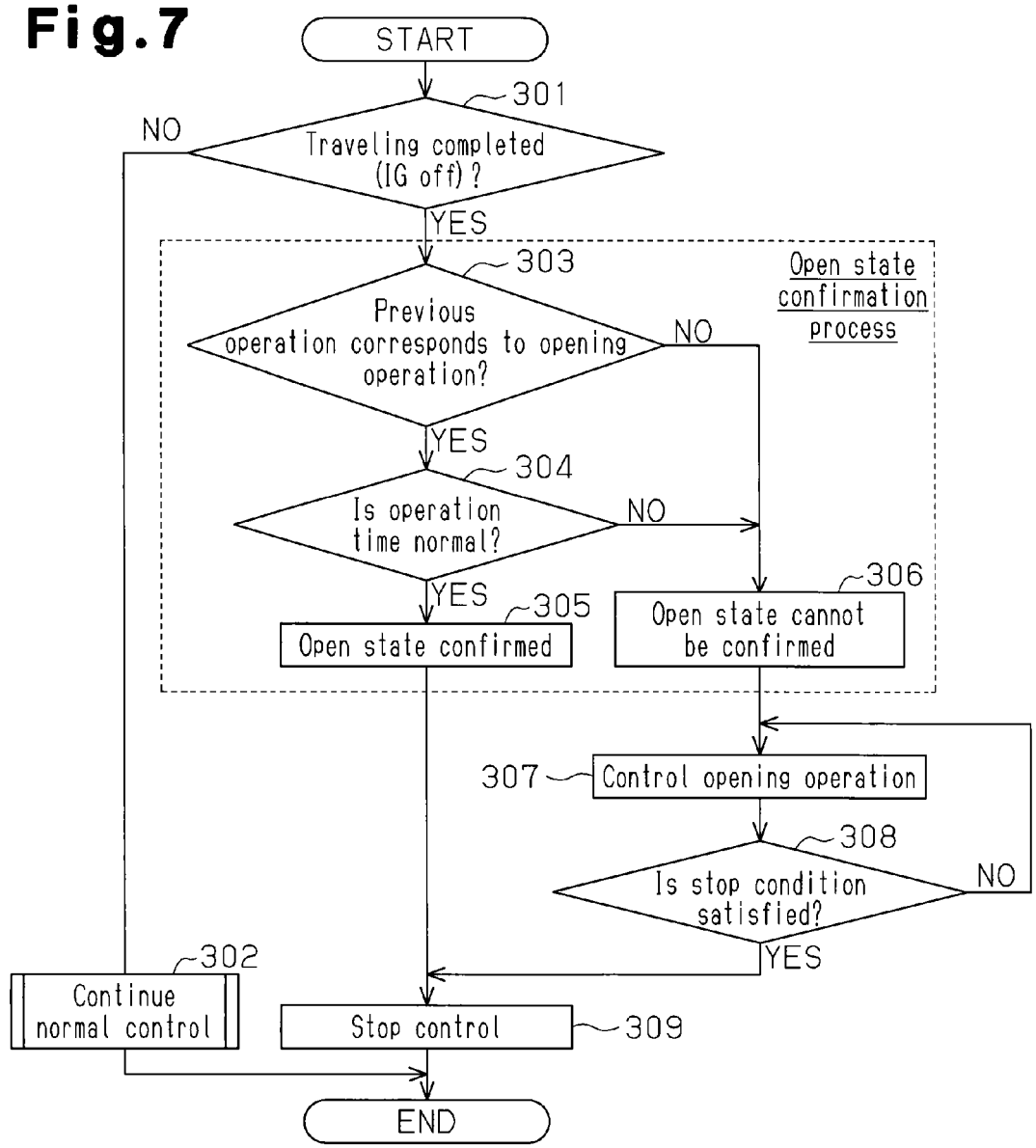
FIG. 7 is a flowchart illustrating a control process of a grill shutter device according to a third embodiment.

More specifically, as shown in the flowchart of FIG. 7, if the vehicle 1 is in the traveling end state (i.e., YES in step S301), the ECU 20 determines whether the previous operation of the shutter mechanism 11 was the opening operation (step S303). Also, the ECU 20 determines whether the operation time of the shutter mechanism 11 in the previous operation was normal (step S304). Specifically, the ECU 20 stores a preset normal operation time, and determines whether the operation time of the shutter mechanism 11 in the previous operation was the normal operation time. The phrase "normal operation time" may refer to a value showing a single operation time, or values showing an acceptable range of the operation time that can be considered as normal.

If all the determination conditions shown in steps S303 and S304 are satisfied (i.e., YES in step S303 and YES in step S304), the ECU 20 confirms that the shutter mechanism 11 is in the open state (step S305). In contrast, if any of the determination conditions is not satisfied (i.e., NO in step S303 or NO in step S304), the ECU 20 determines that the open state of the shutter mechanism 11 cannot be confirmed (step S306).

That is, if the previous operation was not the opening operation, the shutter mechanism 11 is not in the open state. Further, if the operation time of the shutter mechanism 11 in the immediately previous opening operation was not normal, the shutter mechanism 11 may not be in the open state.

If the ECU 20 determines that the open state of the shutter mechanism 11 cannot be confirmed (step S306), the ECU 20 controls the shutter mechanism 11 to open the shutter mechanism 11 in the same manner as in the above first embodiment (steps S307 and S308). If the stop condition is satisfied (i.e., YES in step S308), the ECU 20 suspends the control of the shutter mechanism 11 (step S309).

As mentioned above, according to the present embodiment, advantages the same as those of the above first embodiment can be obtained. In particular, in the present embodiment, the open state of the shutter mechanism 11 is confirmed and determined with high accuracy in a simple structure on the basis of the operation time of the shutter mechanism 11 in the immediately previous opening operation.

Since steps S301 and S302, and steps S307 to S309 in the flowchart of FIG. 7 are each equivalent to corresponding one of steps S101 and S102, and steps S109 to S111 in the flowchart of FIG. 3, the explanations thereof are omitted.

The above embodiments may be modified as follows.

In each of the embodiments, the shutter mechanism 11 is provided in the grill opening 7 through which the air taken into the engine compartment 3 in the front portion of the body 2 passes. However, the shutter mechanism 11 is not limited to this. The shutter mechanism 11 may be provided in a grill opening through which the air taken into an inner space of the vehicle body 2 other than the engine compartment 3 passes. For example, the shutter device of the present invention may be applied to vehicles in which the engine is absent in the space of the vehicle body forward from the passenger compartment, such as vehicles in which the engine is arranged in the rear portion or the central portion of the vehicle body, or an electric vehicle.

In each of the above embodiments, the grill opening 7 is formed below the bumper 8. However, the shutter device of the present invention is not limited to this. The shutter device may be applied to a grill opening provided above the bumper 8. That is, the front grill 9 may be an upper grill.

In each of the above embodiments, the shutter mechanism 11 is opened and closed according to the rotation of each of the movable fins 14. However, the shutter mechanism is not limited to this. The shutter mechanism may be of a sliding type as well as a rotation type as described above, or have a swinging movable body.

In each of the above embodiments, a predetermined stop condition (steps S110, S208, and S308) regarding the opening operation control (steps S109, S207, and S307) after the end of traveling corresponds to a lapse of predetermined time from the start of the opening operation control. However, the stop condition is not limited to this. The stop condition may be changed as necessary.

The ECU 20, which serves as a confirmation portion, is configured to perform the open state confirmation process after the end of traveling of the vehicle on the basis of the operation amount of the shutter mechanism 11 in the first embodiment, the operation position of the shutter mechanism 11 in the second embodiment, and the operation time of the shutter mechanism 11 in the third embodiment.

That is, in the first embodiment, it is determined whether the previous operation of the shutter mechanism 11 was the opening operation (step S103), whether the operation amount of the shutter mechanism 11 in the previous operation was normal (step S104), whether the pulse has been generated after the end of the previous operation of the shutter mechanism 11, and whether the pulse signals Sp are normal (step S106). In the second embodiment, it is determined whether the open position limit switch 23 is turned ON (step S203), and whether the open position limit switch 23 is normal (step S204). In the third embodiment, it is determined whether the previous operation of the shutter mechanism 11 was the opening operation (step S303), and whether the operation time of the shutter mechanism 11 in the previous operation is normal (step S304).

However, the mode of the open state confirmation need not be limited to them. The open state confirmation process may be performed by using any combination or a single one of the above determination conditions regarding the confirmation of the open state including other determination conditions.

The process as shown in the flowchart of FIG. 8 may be performed. That is, in the same manner as in each of the above embodiments, when the vehicle 1 is in the traveling end state (i.e., YES in step S401), the ECU 20 performs the open state confirmation process (first time) (step S403), and if the open state cannot be confirmed in the confirmation process (i.e., NO in step S404), the ECU 20 performs the opening operation control (steps S405 and S406). In the flowchart of FIG. 8, the ECU 20 performs the open state confirmation process (second time) again thereafter (step S407). If the open state of the shutter mechanism 11 cannot be confirmed even in the second time open state confirmation process (i.e., NO in step S408), the ECU 20 performs the opening operation control again (steps S409 and S410). Accordingly, the shutter mechanism is more reliably prevented from being held stopped in the closed state.

In the above flowchart, the first time open state confirmation process (step S403) and the second time open state confirmation process (step S407) may be different from each other. Also, the first time stop condition determination process (step S403) and the second time stop condition determination process (step S407) may be different from each other.

In the above first embodiment, the ECU 20, which serves as an operation amount detection portion, is configured to detect the operation amount of the shutter mechanism 11 by counting (the edges of) the pulse signals Sp output by the pulse sensor 22, which serves as a pulse outputting portion. However, the present invention is not limited to this. The pulse outputting portion need not be provided as long as the pulse signals such as current ripples generated in the motor 18, for example, in synchronization with the opening and closing operations of the shutter mechanism 11 can be obtained.

The pulse outputting portion need not be the pulse sensor 22 using a Hall IC as in the above first embodiment. The pulse outputting portion may be the one using an encoder. Further, the pulse outputting portion may be provided at a position other than the motor 18 such as a reducer of the actuator portion 12, for example.

The present invention may be configured to determine that it cannot be confirmed that the shutter mechanism 11 is in the open state according to a fact that the pulse signals Sp are not normal even if the fault of the pulse sensor 22 cannot be specified. Further, the present invention may be configured to detect the fault of the sensor according to methods other than the methods described in each of the above embodiments. In this case, it may be determined that the pulse signals Sp are not normal according to the detection of the fault of the sensor.

In the above second embodiment, the ECU 20, which serves as a position detection portion, is configured to detect the operation position of the shutter mechanism 11 on the basis of the output signals S1 and S2 of the limit switches 23 and 24. However, the ECU 20 is not limited to this. The ECU 20 may adopt a configuration in which the absolute position of the shutter mechanism 11 is detected by counting the pulse signals Sp with a specific position (for example, full open position) as reference or using a potentiometer or a magnetic absolute angle sensor. That is, the open state of the shutter mechanism 11 can be confirmed with higher accuracy by detecting not only the operation position corresponding to the open state (or closed state) but also the absolute position of the shutter mechanism 11.

Even in a case where the absolute position is detected, in the same manner as in the case of detecting the operation amount (relative position) in the above first embodiment, if a fault of the pulse signals Sp is detected or if a fault of the sensor is detected, for example, it may be determined that the open state of the shutter mechanism 11 cannot be confirmed.

In the above second embodiment, the operation position of the shutter mechanism 11 corresponds to the rotation position of each of the movable fins 14. However, for example, in the case of the sliding type shutter mechanism, the traveling position of each of the fins may correspond to the operation position of the shutter mechanism 11.

In each of the above embodiments, it is recognized that the vehicle 1 is in the traveling end state (operation end state) according to a fact that the ignition switch (start switch) of the vehicle 1 is turned OFF. However, the present invention may be configured to determine that the vehicle 1 is in the traveling end state (operation end state) on the basis of the determination conditions other than the above determination condition. For example, in vehicles such as an electric vehicle and a hybrid vehicle, the present invention may be configured such that it is determined that the vehicle 1 is in the traveling end state (operation end state) when a master electrical switch (start switch) is turned OFF.

In the above first embodiment, the ECU 20, which serves as a confirmation portion, is configured to determine that the open state of the shutter mechanism 11 cannot be confirmed when the pulse count number in the previous operation is not normal. In the above third embodiment, the ECU 20 is configured to determine that the open state of the shutter mechanism 11 cannot be confirmed when the operation time of the shutter mechanism 11 in the previous operation is not normal. However, the basis of the open state confirmation is not limited to a value in the previous operation. The open state confirmation may be performed on the basis of whether the cumulative value (or average value) of all the operations of the shutter mechanism 11 until the vehicle comes into the traveling end state (IG OFF) is normal.

Next, the technical idea that can be obtained from the above embodiments will be described.

(A) The grill shutter device according to claim 11, wherein the position detection portion is configured to detect the absolute position by counting pulse signals, which are in synchronization with the opening and closing operations of the shutter mechanism, with a specific position as reference. This allows the absolute position detection with respect to the operation position of the shutter mechanism with a simple structure.

(B) The grill shutter device according to any one of claims 1 to 15, wherein the control portion is configured such that it does not perform the opening operation of the shutter mechanism when the open state of the shutter mechanism is confirmed by the confirmation portion.

(C) A grill shutter mechanism comprising:
a shutter mechanism adapted to be provided in a grill opening of a vehicle body, wherein the shutter mechanism is operable to be opened and closed to control a flow rate of air flowing into the vehicle body; and
a control portion, which controls opening and closing operations of the shutter mechanism, wherein the control portion is configured to confirm the open state of the shutter mechanism when a start switch of a vehicle is turned OFF, to control the shutter mechanism to open the shutter mechanism if the open state of the shutter mechanism is not confirmed, and not to perform the opening operation of the shutter mechanism if the open state of the shutter mechanism is confirmed.

The invention claimed is:

1. A grill shutter device comprising:
a shutter mechanism adapted to be provided in a grill opening in a front portion of a vehicle body, wherein the shutter mechanism is operated to be opened and closed to control a rate of flow of an air flowing into the vehicle body;
an electronic control unit, which controls opening and closing operations of the shutter mechanism, wherein the electronic control unit is configured to
determine whether a vehicle is in a traveling end state;
detect an operation amount of the shutter mechanism by counting pulse signals that are in synchronization with the opening and closing operations of the shutter mechanism;
confirm that the shutter mechanism is in an open state based on the operation amount of the shutter mechanism when the vehicle is in the traveling end state; and
determine whether the pulse signals are normal, wherein
in a case where a previous operation of the shutter mechanism is an opening operation, the electronic control unit determines that the open state of the shutter mechanism cannot be confirmed if the operation amount in the opening operation is not a preset normal operation amount,
the electronic control unit determines that the open state of the shutter mechanism cannot be confirmed when determining that the pulse signals are not normal, and
the electronic control unit controls the shutter mechanism to open the shutter mechanism when the open state of the shutter mechanism is not confirmed.

2. The grill shutter device according to claim 1, further comprising:
a pulse outputting portion, which outputs the pulse signals,
wherein the electronic control unit is configured to detect a fault of the pulse outputting portion.

3. The grill shutter device according to claim 1, wherein in a case where the previous operation of the shutter mechanism is the opening operation, the electronic control unit determines that the open state of the shutter mechanism cannot be confirmed if the electronic control unit detects that the pulse signals have been changed after the opening operation.

4. The grill shutter device according to claim 1, wherein the electronic control unit is configured to detect an operation position of the shutter mechanism, wherein the electronic control unit confirms that the shutter mechanism is in the open state based on the operation position of the shutter mechanism.

5. The grill shutter device according to claim 4, further comprising a limit switch provided corresponding to the open state of the shutter mechanism, wherein the electronic control unit detects an operation position of the shutter mechanism that corresponds to the open state based on an operation state of the limit switch.

6. The grill shutter device according to claim 5, wherein the electronic control unit is configured to detect a fault of the limit switch, wherein the electronic control unit determines that the open state of the shutter mechanism cannot be confirmed when detecting a fault of the limit switch.

7. The grill shutter device according to claim 4, wherein the electronic control unit is configured to detect the operation position as an absolute position.

8. The grill shutter device according to claim 7, wherein the electronic control unit is configured to detect the absolute position by counting pulse signals, which are in synchronization with the opening and closing operations of the shutter mechanism, with a specific position as reference.

9. The grill shutter device according to claim 1, wherein the electronic control unit is configured to measure operation time of the shutter mechanism, wherein the electronic control unit confirms that the shutter mechanism is in the open state based on the operation time.

10. The grill shutter device according to claim 9, wherein in a case where the previous operation of the shutter mechanism is an opening operation, the electronic control unit determines that the open state of the shutter mechanism cannot be confirmed if the operation time in the opening operation is not a preset normal operation time.

11. The grill shutter device according to claim 1, wherein the electronic control unit determines that the open state of the shutter mechanism cannot be confirmed when the previous operation of the shutter mechanism is not the opening operation.

12. The grill shutter device according to claim 1, wherein if the open state of the shutter mechanism is not confirmed even after the electronic control unit controlled the shutter mechanism to open the shutter mechanism in the traveling end state, the electronic control unit controls the shutter mechanism to open the shutter mechanism again.

13. The grill shutter device according to claim 1, wherein the electronic control unit is configured such that it does not perform the opening operation of the shutter mechanism when confirming the open state of the shutter mechanism.

14. A grill shutter mechanism comprising:
a shutter mechanism adapted to be provided in a grill opening of a vehicle body, wherein the shutter mechanism is operable to be opened and closed to control a flow rate of air flowing into the vehicle body; and
an electronic control unit, which controls opening and closing operations of the shutter mechanism, wherein the electronic control unit is configured to
detect an operation amount of the shutter mechanism by counting pulse signals that are in synchronization with the opening and closing operations of the shutter mechanism,
confirm the open state of the shutter mechanism based on the operation amount of the shutter mechanism when a start switch of a vehicle is turned OFF,
determine whether the pulse signals are normal,
determine that the open state of the shutter mechanism cannot be confirmed when determining that the pulse signals are not normal,
control the shutter mechanism to open the shutter mechanism if the open state of the shutter mechanism is not confirmed, and
refrain from performing the opening operation of the shutter mechanism if the open state of the shutter mechanism is confirmed.

* * * * *